United States Patent
Wu et al.

(10) Patent No.: US 11,017,083 B2
(45) Date of Patent: May 25, 2021

(54) MULTIPLE PHASE GRAPH PARTITIONING FOR MALWARE ENTITY DETECTION

(71) Applicant: International Business Machines Corporation, Armonk, NY (US)

(72) Inventors: Ci-Hao Wu, Taipei (TW); Ying-Chen Yu, Taipei (TW); June-Ray Lin, Taipei (TW); Hsieh-Lung Yang, Taipei (TW); Chen-Yu Huang, Taipei (TW); Chia-Heng Lin, Taipei (TW); Kuei-Ching Lee, New Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 16/162,597

(22) Filed: Oct. 17, 2018

(65) Prior Publication Data
US 2020/0125727 A1    Apr. 23, 2020

(51) Int. Cl.
*G06F 21/56*     (2013.01)
*G06N 3/04*     (2006.01)
(Continued)

(52) U.S. Cl.
CPC ........ *G06F 21/562* (2013.01); *G06F 16/9024* (2019.01); *G06F 40/289* (2020.01); *G06N 3/04* (2013.01); *G06N 3/08* (2013.01)

(58) Field of Classification Search
CPC .......... G06F 21/57; G06F 17/30; G06F 12/14; G06F 17/50; G06F 21/56; G06F 16/9024;
(Continued)

(56) References Cited

U.S. PATENT DOCUMENTS 7,409,328 B1 *   8/2008   McGaughy ........... G06F 30/367
                                                                            703/14
7,644,076 B1     1/2010   Ramesh et al.
(Continued)

FOREIGN PATENT DOCUMENTS

RU     2016114944 A    11/2017
RU     2645268 C2     2/2018

OTHER PUBLICATIONS

Mell et al.; "The NIST Definition of Cloud Computing—Recommendations of the National Institute of Standards and Technology"; U.S. Department of Commerce; Sep. 2011; 7 pages.
(Continued)

*Primary Examiner* — Thanhnga B Truong
(74) *Attorney, Agent, or Firm* — Cantor Colburn LLP; Richard Wilhelm

(57) ABSTRACT

Provided are systems, methods, and media for multiphase graph partitioning for malware entity detection. An example method includes receiving an input string associated with the malware entity. A determination is made as to whether the input string includes a symbolic word, a non-symbolic word, a symbolic phrase, or a non-symbolic phrase. A branching graph is formed based on a combination of the input string and a plurality of stored strings that are each associated with the malware entity to determine whether the input string is a valid detection name of the malware entity, in which the branching graph is formed by at least performing a first graph partitioning stage and a second graph partitioning stage. The input string is then labeled based on the formed branching graph and then outputted to a malware detection engine.

20 Claims, 10 Drawing Sheets

(51) Int. Cl.
*G06N 3/08* (2006.01)
*G06F 16/901* (2019.01)
*G06F 40/289* (2020.01)

(58) Field of Classification Search
CPC ...... G06F 21/562; G06F 40/289; G06F 8/658; G06F 21/577; G06F 8/65; G06F 16/90344; G06K 9/62; G06N 3/04; G06N 3/08; G06N 99/00; G06N 7/00; H04L 63/1408; H04L 63/145

See application file for complete search history.

(56) References Cited

U.S. PATENT DOCUMENTS

| | | | |
|---|---|---|---|
| 8,321,942 B1 | 11/2012 | Chiueh et al. | |
| 8,381,289 B1* | 2/2013 | Pereira | H04L 63/1408 726/22 |
| 8,701,162 B1 | 4/2014 | Pedersen | |
| 8,725,749 B2* | 5/2014 | Horne | G06F 16/90344 707/756 |
| 8,732,825 B2 | 5/2014 | Park et al. | |
| 9,177,225 B1* | 11/2015 | Cordova-Diba | G06K 9/00671 |
| 9,690,938 B1* | 6/2017 | Saxe | G06N 3/04 |
| 9,767,290 B2* | 9/2017 | Murthy | G06F 8/658 |
| 9,977,778 B1 | 5/2018 | Perez et al. | |
| 2007/0289015 A1 | 12/2007 | Repasi et al. | |
| 2009/0300761 A1 | 12/2009 | Park et al. | |
| 2013/0191915 A1 | 7/2013 | Antonakakis et al. | |
| 2018/0121415 A1 | 5/2018 | Perez et al. | |

OTHER PUBLICATIONS

Najafi et al.; "Guilt-by-Association: Detecting Malicious Entities via Graph Mining"; ICST Institute for Computer Sciences, Social Informatics, and Telecommunications Engineering 2018; 20 pages.

* cited by examiner

MULTIPLE PHASE GRAPH PARTITIONING FOR MALWARE ENTITY DETECTION

BACKGROUND

The present invention generally relates to malware detection, and more specifically, to multiphase graph partitioning for malware entity detection.

Some systems for detecting malware entities rely on a natural language processing (NLP) engine to report names of malware entities that are found in a string of text, in which the names are detection names used for detecting instances of a given malware. However, NLP engines are presently unable to automatically evaluate the quality of the names that are reported. Some systems have technical problems and technical limitations that result in the system misidentifying malware detection names as being a suitable (i.e., valid) detection name for a malware entity, which may result in the system failing to detect the malware entity in future instances.

SUMMARY

Embodiments of the present invention provide a computer-implemented method for identifying one or more valid malware detection names and malware common names for a malware entity. A non-limiting example of the computer-implemented method includes receiving, by a system comprising one or more processors, an input string associated with the malware entity. The method further includes determining, by the system, whether the input string includes a symbolic word, a non-symbolic word, a symbolic phrase comprising the symbolic word and the non-symbolic word, or a non-symbolic phrase comprising the non-symbolic word and a second non-symbolic word. The method further includes upon determining that the input malware string includes the symbolic word or the symbolic phrase, forming by the system a branching graph based on a combination of the input string and a plurality of stored strings that are each associated with the malware entity to determine whether the input string is a valid detection name of the malware entity. The branching graph is formed by at least performing a first graph partitioning stage and a second graph partitioning stage, in which the first graph partitioning stage is performed via character chi-square histogram similarity, in which the second graph partitioning stage is performed via node splitting and merging of split nodes. The method further includes labeling, by the system, the input string as being a valid detection name for the malware entity based, at least in part, on detecting whether the symbolic word is within the formed branching graph. The method further includes outputting, by the system, the label of the input string to a malware detection engine.

Embodiments of the present invention provide a system for identifying one or more valid malware detection names for a malware entity, in which the system includes one or more processors configured to perform a method. A non-limiting example of the method includes receiving, by the system, an input string associated with the malware entity. The method further includes determining, by the system, whether the input string includes a symbolic word, a non-symbolic word, a symbolic phrase comprising the symbolic word and the non-symbolic word, or a non-symbolic phrase comprising the non-symbolic word and a second non-symbolic word. The method further includes upon determining that the input malware string includes the symbolic word or the symbolic phrase, forming by the system a branching graph based on a combination of the input string and a plurality of stored strings that are each associated with the malware entity to determine whether the input string is a valid detection name of the malware entity. The branching graph is formed by at least performing a first graph partitioning stage and a second graph partitioning stage, in which the first graph partitioning stage is performed via character chi-square histogram similarity, in which the second graph partitioning stage is performed via node splitting and merging of split nodes. The method further includes labeling, by the system, the input string as being a valid detection name for the malware entity based, at least in part, on detecting whether the symbolic word is within the formed branching graph. The method further includes outputting, by the system, the label of the input string to a malware detection engine.

Embodiments of the invention provide a computer program product for identifying one or more valid malware detection names and its common names for a malware entity, the computer program product comprising a computer readable storage medium having program instructions embodied therewith. The program instructions are executable by a system comprising one or more processors to cause the processor to perform a method. A non-limiting example of the method includes receiving, by the system, an input string associated with the malware entity. The method further includes determining, by the system, whether the input string includes a symbolic word, a non-symbolic word, a symbolic phrase comprising the symbolic word and the non-symbolic word, or a non-symbolic phrase comprising the non-symbolic word and a second non-symbolic word. The method further includes upon determining that the input malware string includes the symbolic word or the symbolic phrase, forming by the system a branching graph based on a combination of the input string and a plurality of stored strings that are each associated with the malware entity to determine whether the input string is a valid detection name of the malware entity. The branching graph is formed by at least performing a first graph partitioning stage and a second graph partitioning stage, in which the first graph partitioning stage is performed via character chi-square histogram similarity, in which the second graph partitioning stage is performed via node splitting and merging of split nodes. The method further includes labeling, by the system, the input string as being a valid detection name for the malware entity based, at least in part, on detecting whether the symbolic word is within the formed branching graph. The method further includes outputting, by the system, the label of the input string to a malware detection engine.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
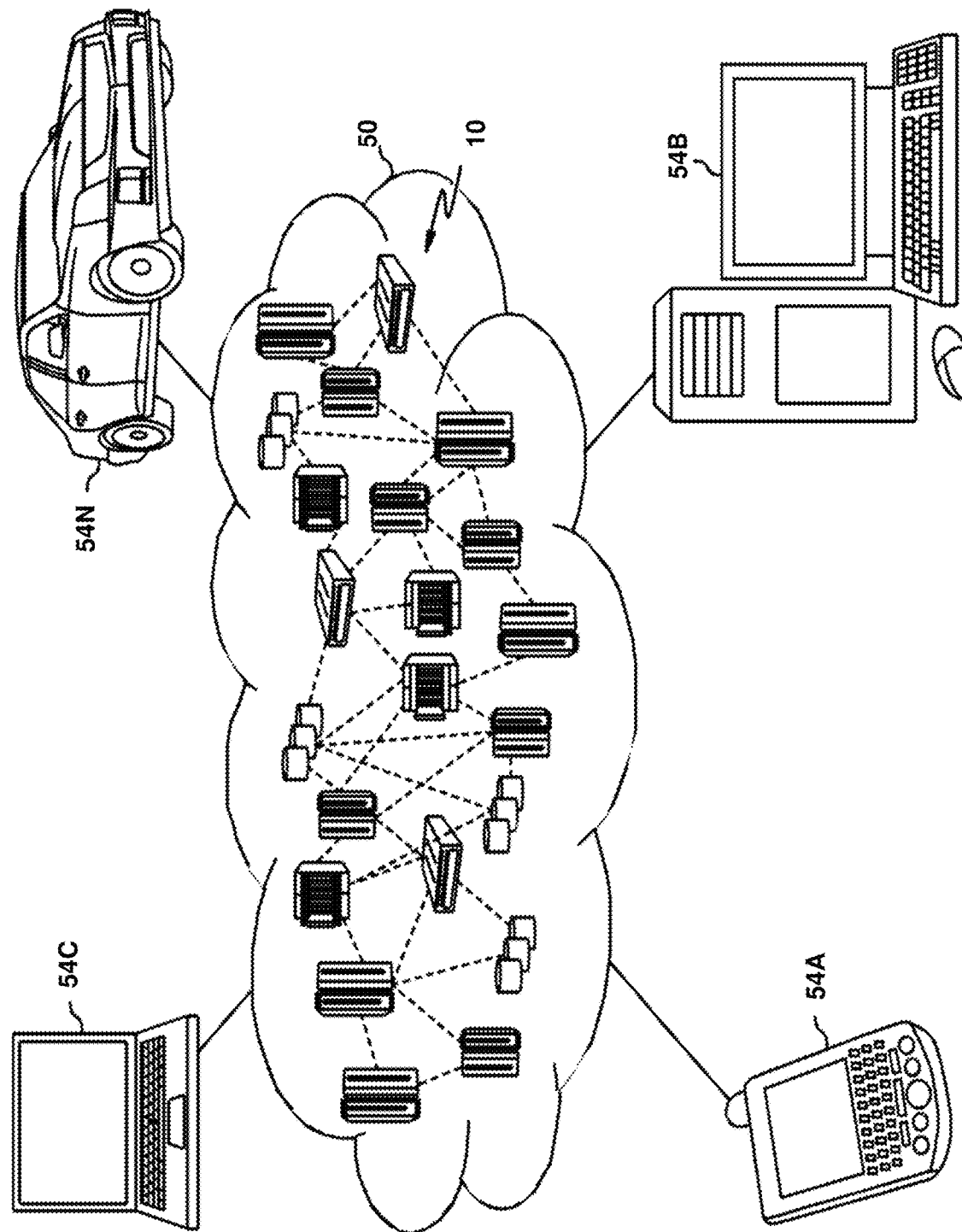
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
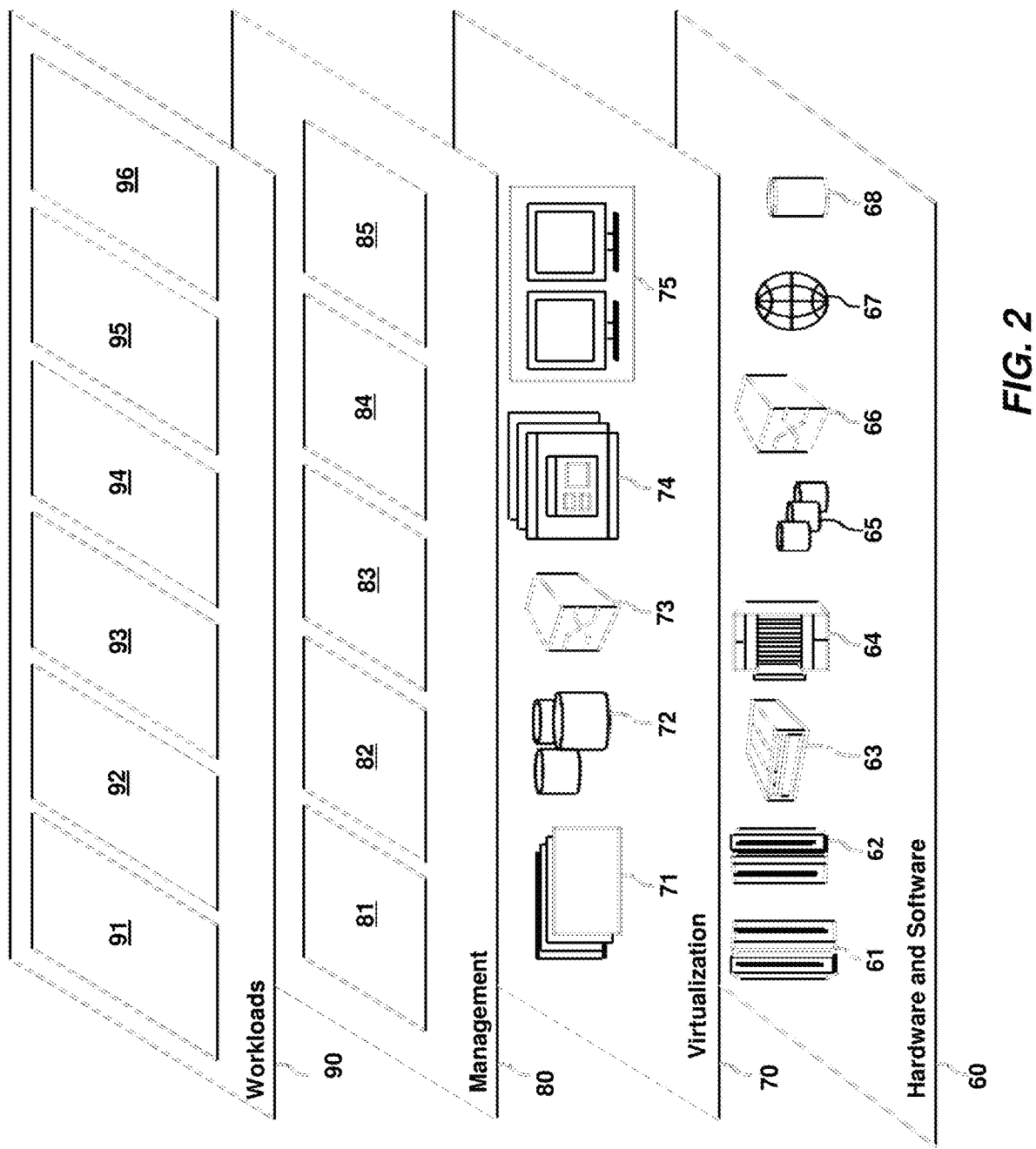
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and malware entity detection processing 96.

Turning now to an overview of technologies that are more specifically relevant to aspects of the invention, as noted above, some systems for detecting malware entities rely on a natural language processing (NLP) engine to report names of malware entities found in a string of text, in which the names are detection names to be used for detecting instances of a given malware. However, NLP engines are presently unable to automatically evaluate the quality of the names that are reported. Some systems have technical problems and technical limitations that result in the system misidentifying malware detection names as being a suitable (i.e., valid) detection name for a malware entity, which may result in failing to detect the malware entity in future instances. For example, in one example scenario, a NLP engine may misidentify the following words as being suitable malware detection names for a given malware: (a) "As.discussed-.in.the.Symantec.whitepaper"; (b) "T.O.V.A"; and (c) "Get-WindowsDirectoryA." These words, however, are each likely unsuitable to be used as a malware detection name as these words are often found in non-malicious code or not unique to a particular malware entity or a family of malware entities.

Turning now to an overview of the aspects of the invention, one or more embodiments of the invention address the above-described shortcomings of the prior art by providing an automatic mechanism that identifies whether a string returned by an NLP engine includes a suitable name of a malware entity, a suitable detection name, malware name, and/or exploit kit name. The identification is achieved via a multiphase pipeline approach. In some embodiments of the present invention, the multiphase pipeline approach includes an approach for processing strings having symbolic words or phrases (i.e., a symbolic approach), an approach for processing strings having non-symbolic words or phrases (i.e., a non-symbolic approach), and an approach for processing strings having both symbolic and non-symbolic words or phrases (i.e., a composition approach).

As used herein, the term "symbolic word" generally, but not exclusively, refers to a string of text that includes alphanumeric characters and at least one symbol such as a period, dash, asterisk, etc. For example, "Satori.Coin.Robber" is a symbolic word.

As used herein, the term "non-symbolic word" generally, but not exclusively, refers to a string of text that includes alphanumeric characters and no symbols. For example, "WebSlaver" is a non-symbolic word.

As used herein, the term "symbolic phrase" generally, but not exclusively, refers to a string of text that includes alphanumeric characters, at least one space, and at least one symbol. For example, "Trojan-FakeAV.Win32.OpenCloud family" is a symbolic word, which is made up of the symbolic word "Trojan-FakeAV.Win32.OpenCloud," a space, and the non-symbolic word "family."

As used herein, the term "non-symbolic phrase" generally, but not exclusively, refers to a string of text that includes alphanumeric characters, a space, and no symbols. For example, "ChewBacca trojan" is a non-symbolic phrase, which is made up of the non-symbolic word "ChewBacca", a space, and the non-symbolic word "trojan."

In some embodiments of the present invention, the symbolic word approach includes identifying valid detection names in a graph by identifying one or more symbolic words that have tokens that form a branching graph. For example, in some embodiments of the present invention, when an input string includes one or more symbolic words, a weighted fully connected graph is constructed of symbolic strings whose weights are established based on a chi-square character similarity. In some embodiments of the present invention, after a first order thresholding, malware detection names are separated into different groups. In some embodiments of the present invention, a node splitting and merging procedure is then performed for the separated graph to separate symbolic words into tokens (e.g., a subset of alphanumeric characters of a symbolic word) and to merge tokens to form a branching graph (if any). As a result of the node splitting and merging procedure, symbolic words that form a branching graph are labeled as being valid detection names, whereas symbolic words that do not form a branching graph are labeled as not being a valid detection name.

In regards to the non-symbolic phrase approach, in some embodiments of the present invention, a malware detection that takes the form of a non-symbolic phrase made up of a non-dictionary non-symbolic word (e.g., a coined word) and a generic non-symbolic word would be deemed to be a valid malware common name. A malware detection name that takes the form of a non-symbolic phrase made up of two generic non-symbolic words would be deemed to not be a valid malware common name. For example, in some embodiments of the present invention, the non-symbolic phrase "Goznym trojan" would be deemed to be a valid detection name as the non-symbolic phrase is made up of a non-dictionary non-symbolic word ("Goznym") and a generic term ("trojan"). In contrast, the non-symbolic phrase "trojan malware" would not be deemed to be a valid detection name as the non-symbolic phrase is made up of two generic non-symbolic words ("trojan" and "malware"). Example generic terms include, but are not limited to, "trojan", "malware", "worm", "backdoor", "ransomware", and/or other words that may be used to refer to a malware's format and behavior generally, but which do not indicate any specific malware entity. In some embodiments of the present invention, a word2vec neural network of words is trained to obtain a vector representation of words. The vector representation of words is then utilized to identify which words have a semantic meaning that is similar to the word "malware." A bag-of-words model of generic words may then be obtained. In some embodiments of the present invention, a naming convention detector is executed that is configured to determine whether a non-symbolic word is a function name.

In regards to composition approach, in some embodiments of the present invention, the composition approach includes performing a combination of the symbolic word approach and the non-symbolic phrase approach for input strings that include phrases that are composed of a combination of symbolic words and non-symbolic words. For example, in some embodiments of the present invention, the symbolic and non-symbolic approaches are both utilized to cluster phrases into groups of suitable and unsuitable malware detection/common names (i.e., valid malware detection/common names vs invalid malware detection/common names). In some embodiments of the present invention, a 12% reduction in the number of unsuitable malware names that are identified may be achieved. In some embodiments of the present invention, the composition approach includes a composition symbolic phrases approach and/or a composition non-symbolic words approach. In some embodiments of the present invention, the a labeled called 'bad' is returned in an input non-symbolic word is detecting as being a function name such as, for example, "GetModuleHandle", "GetProcAddress," and "GetmoduleFileName". In some embodiments of the present invention, a labeled called "malware name" is returned if an input non-symbolic word is a non-function name such as, for example, "WannaCry," "WannacryptOr," and "Wannacry." In some embodiments of the present invention, a labeled is returned called "uncertain" in other scenarios.

Figure 3:
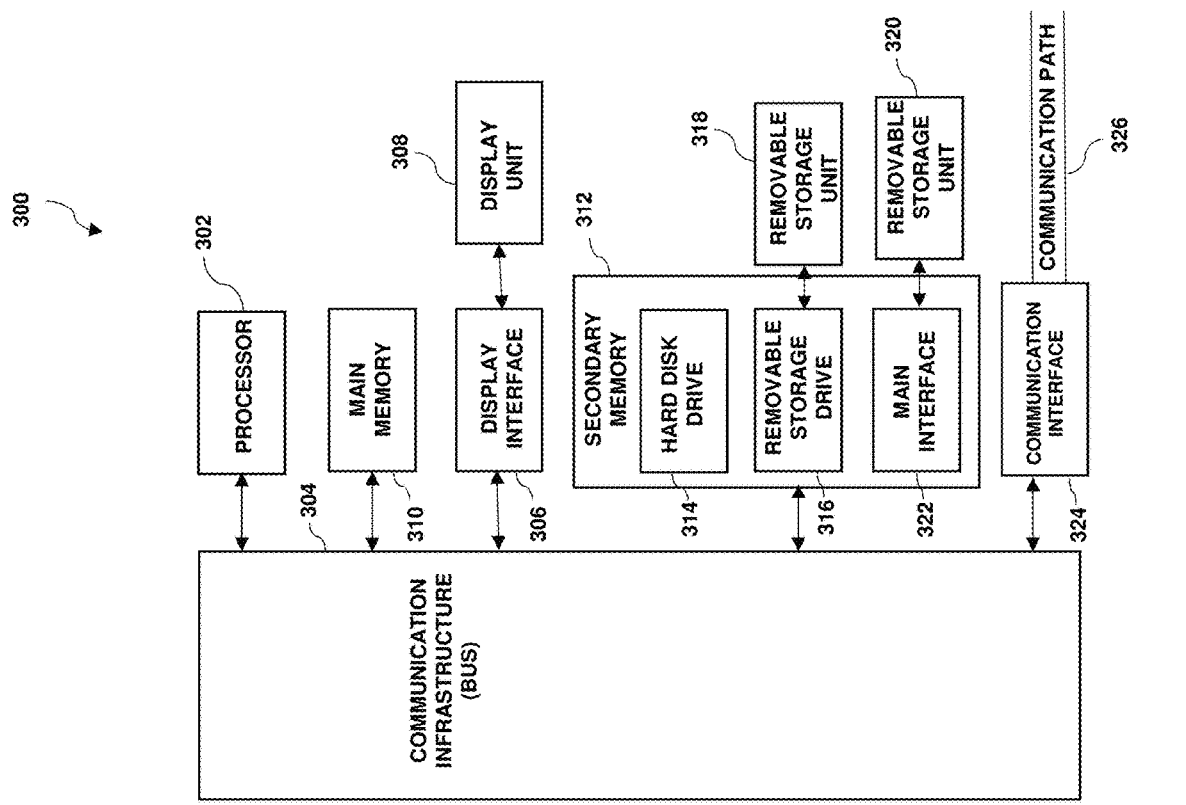
FIG. 3 depicts an example computer system capable of implementing one or more embodiments of the present invention.

Turning now to a more detailed description of aspects of the present invention, FIG. 3 illustrates a high-level block diagram showing an example of a computer-based system 300 that can be used to implement one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably a random-access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
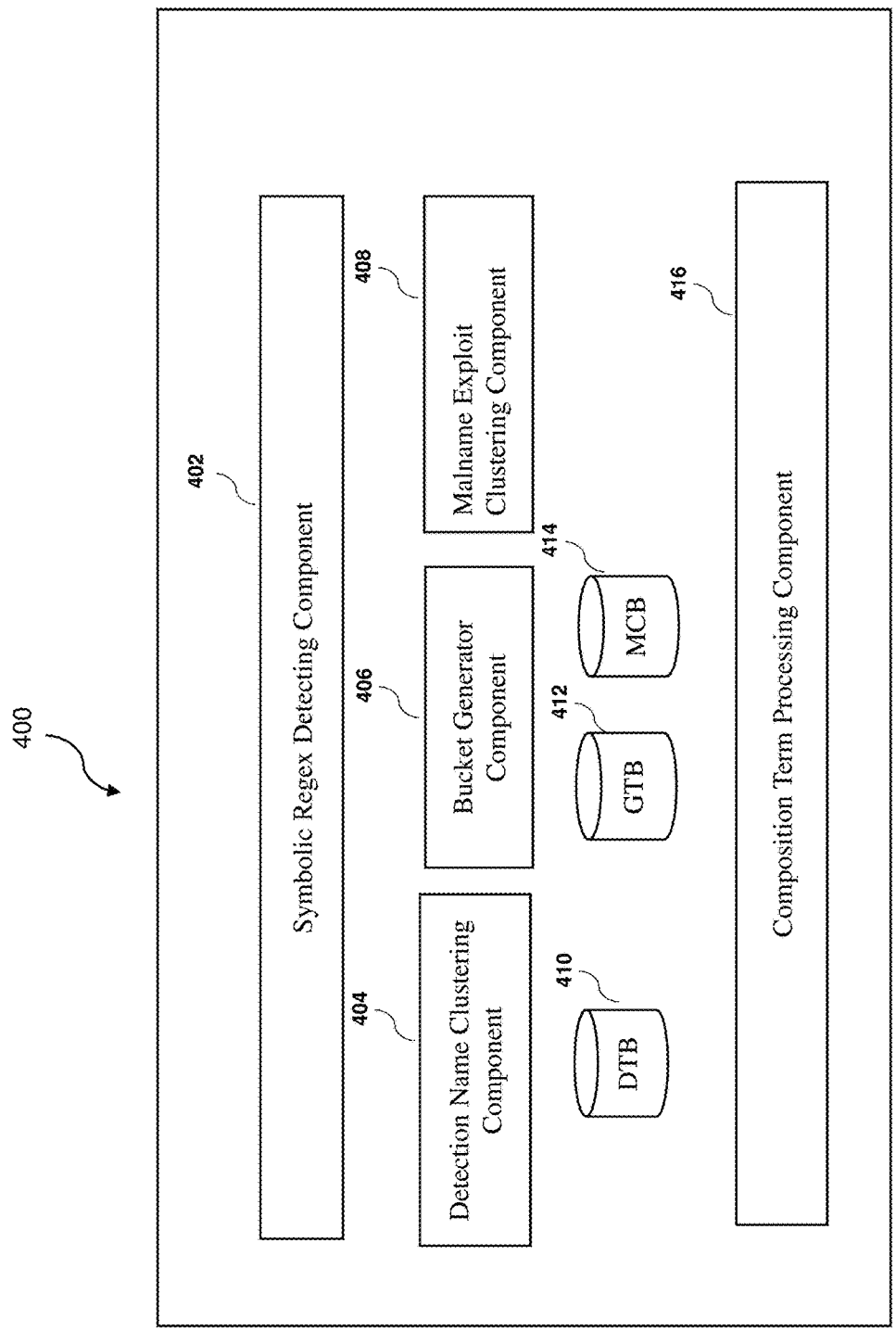
FIG. 4 depicts an example system for performing multiple phase graph partitioning for malware entity detection in accordance with one or more embodiments of the present invention.

Referring now to FIG. 4, an example system 400 is presented for performing multiple phase graph partitioning process for malware entity detection in accordance with one or more embodiments of the present invention. System 400 includes a symbolic regular expression (regex) detecting component 402, a detection name clustering component 404, a bucket generator component 406, a malname exploit clustering component 408, and a composition term processing component 416, and one or more databases 410, 412, 414. In some embodiments of the present invention, the one or more databases includes a detection term bucket (DTB) database 410, a generic term bucket (GTB) database 412, and, a malware collocation bucket (MCB) database 414. In some embodiments of the present invention, symbolic regex detecting component 402, detection name clustering component 404, bucket generator component 406, malname exploit clustering component 408, composition term processing component 416, DTB database 410, GTB database 412, and/or MCB database 414 are interconnected via a communication infrastructure 304 and/or communication path 326. System 400 may have internal and external hardware components, such as those depicted and described above with respect to FIG. 3.

FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims.

In some embodiments of the present invention, system 400 forms part of a multithreaded computer system operating in a concurrent programming environment. In general, in concurrent programming environments, a set of processes may be executed on one or more processors (e.g., processor 302). A process refers to a unit of concurrent programming (e.g., a program or section of a program). Multiple processes may execute the same section of the program simultaneously and each process may, in turn, include multiple threads. A process thread refers to a sub-element of a process or a stream of instructions simultaneously executed within the same program. In concurrent programming, a multithreading processing technique may be employed that enables two or more of the same type of transaction to be carried out simultaneously. Each stream processes a different transaction message.

In some embodiments of the present invention, system 400 is a standalone computing device, a management server, a web server, a mobile computing device, or other suitable electronic device and/or computing system capable of receiving, sending, and processing data. In some embodiments of the present invention, system 400 is a server computing system utilizing multiple computers, such as in cloud computing environment 50 (FIG. 1). In some embodiments of the present invention, system 400 is a laptop computer, a tablet computer, a netbook computer, a personal computer (PC), a desktop computer, a personal digital assistant (PDA), a smartphone, or other suitable programmable electronic device capable of communicating with a user device via a network. In some embodiments of the present invention, system 400 is a computing system utilizing clustered computers and components (e.g., database server computers, application server computers, etc.) that act as a single pool of seamless resources that are accessible within system 400.

Referring back to FIG. 4, in general, system 400 is configured to receive an input string, detect one or more valid malware detection/common names in the input stream based on performing a multistage graph partitioning process, and then output a label of the input string to a malware detection engine. For example, in some embodiments of the present invention, system 400 is configured to receive an input string associated with the malware entity. In some embodiments of the present invention, the input string is received from an NLP engine.

In some embodiments of the present invention, system 400 is configured to form a branching graph upon determining that the input malware string includes a symbolic word and/or a symbolic phrase (e.g., via detection name clustering component 404). In some embodiments of the present invention, the branching graph is formed based on a combination of the input string and a plurality of stored strings that are each associated with the malware entity, in which system 400 utilizes the formed branching graph to determine whether the input string is a valid detection name of the malware entity. In some embodiments of the present invention, the branching graph is formed by performing a first graph partitioning stage and a second graph partitioning stage, in which the first graph partitioning stage is performed via character chi-square histogram similarity, and in which the second graph partitioning stage is performed via node splitting and merging of split nodes.

In some embodiments of the present invention, system 400 is configured to label the input string as being a valid detection name for the malware entity based, at least in part, on detecting whether the symbolic word is within the formed branching graph. In some embodiments of the present invention, system 400 is configured to output the label of the input string to a malware detection engine. In some embodiments of the present invention, a label is outputted to a malware detection engine only if the input string was labeled as being a valid detection name of the malware entity. In some embodiments of the present invention, the malware detection engine is configured to detect future instances of the malware entity based on the outputted label. In some embodiments of the present invention, system 400 includes a NLP engine and/or a malware detection engine.

Figure 5:
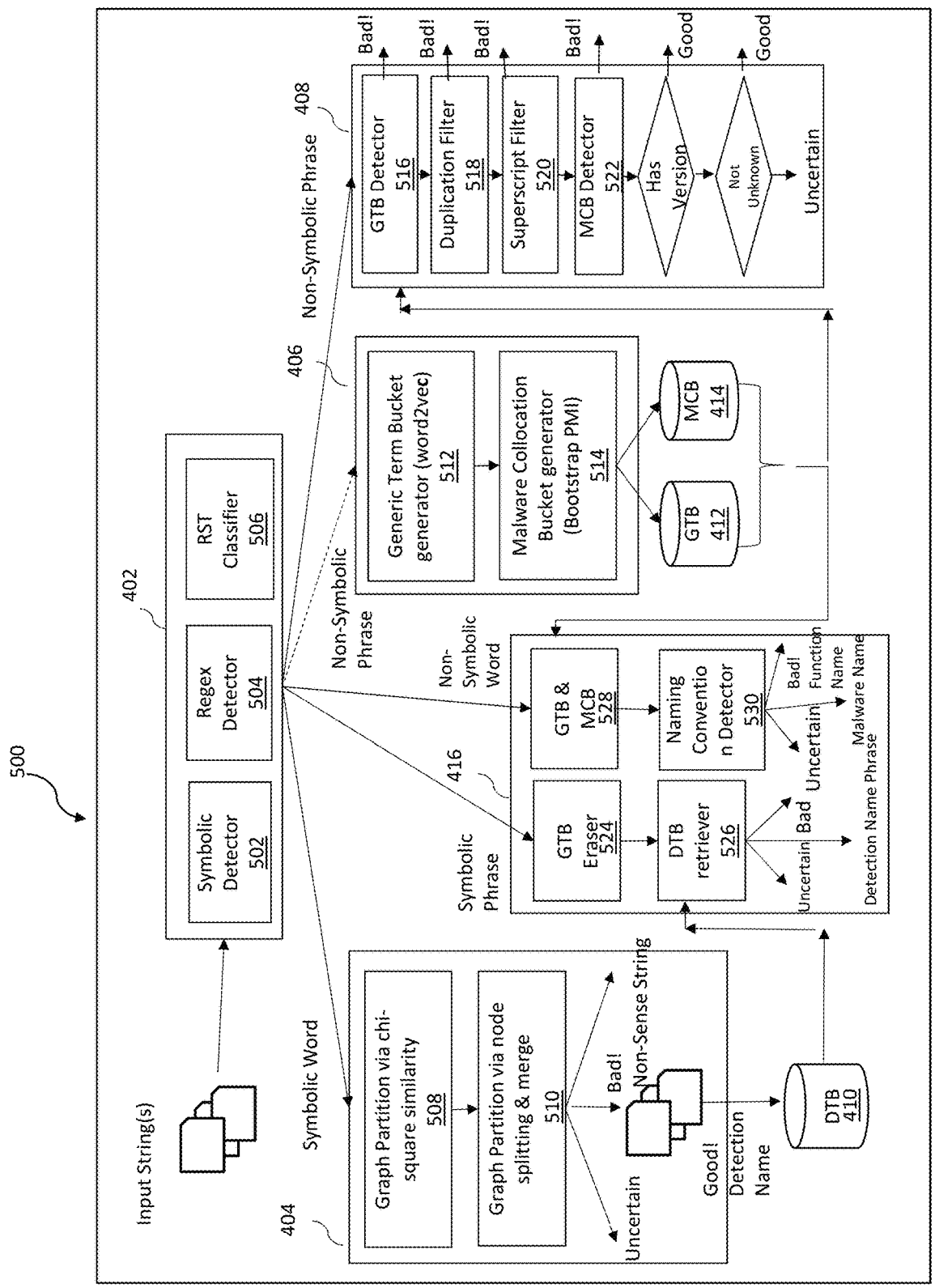
FIG. 5 depicts an example multiple phase pipeline illustrating further detail regarding the components of the example system of FIG. 4 in accordance with one or more embodiments of the present invention.

FIG. 5 depicts an example multiple phase pipeline 500 that illustrates further detail regarding the components of system 400 in accordance with one or more embodiments of the present invention. As shown in FIG. 5, in some embodiments of the present invention, symbolic regex detecting component 402 includes a symbolic detector 502, a regex detector 504, and a RST classifier 506. Symbolic regex detection component 402 is configured to receive an input string and to determine whether a symbolic approach, non-symbolic approach, or a composition approach should be utilized for the input string. In some embodiments of the present invention, symbolic detector 502 is configured to identify whether the input string includes symbolic words or phrases. In some embodiments of the present invention, regex detector 504 is configured to identify whether the input string includes regular expressions such as non-symbolic words and non-symbolic phrases. In some embodiments of the present invention, RST classifier 506 is configured to label the input string as being a symbolic or non-symbolic string based on the outputs of symbolic detector 502 and regex detector 504.

In some embodiments of the present invention, detection name clustering component 404 includes a first graph partitioning stage 508 and a second graph partitioning stage 510. The first graph partitioning stage 508 includes performing graph portioning via chi-square similarity. The second graph portioning stage 510 includes performing graph partitioning via node splitting and merging.

Figure 6:
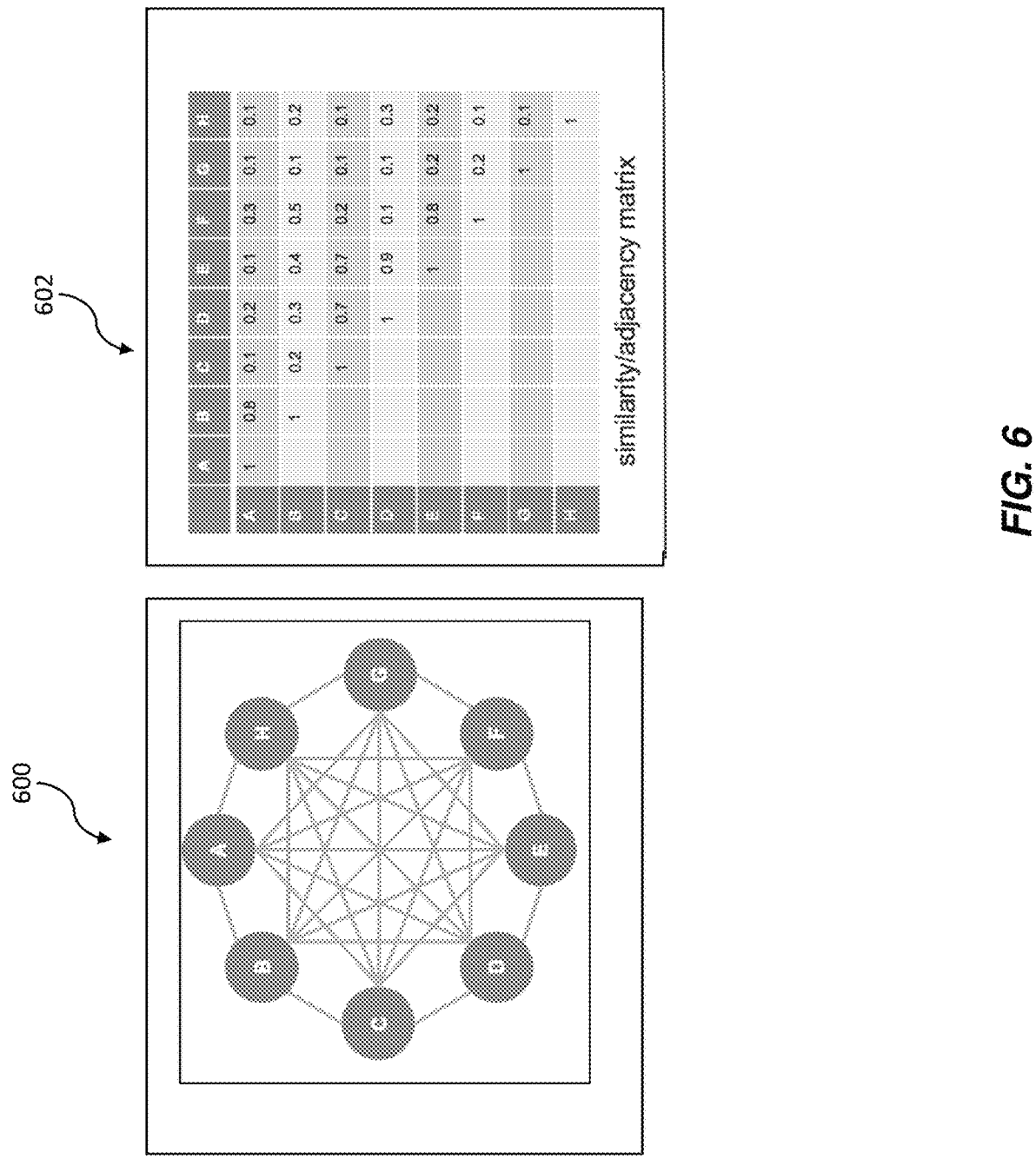
FIG. 6 depicts an example weighted complete graph, and an example histogram of the weighted complete graph, that are each constructed by the example multiple phase pipeline of FIG. 5 in accordance with one or more embodiments of the present invention.

In some embodiments of the present invention, the graph portioning via character chi-square histogram similarity is performed by constructing a weighted complete graph and then performing separation and labeling of nodes of the weighted complete graph. In some embodiments of the present invention, the constructing of the weighted complete graph includes creating a graph having nodes and edges, in which each node represents a string, in which each node is linked to the other nodes via an edge, in which each edge is assigned a weight. In some embodiments of the present invention, the weights are assigned by transforming each node string into a character histogram and then calculating the chi-square similarity between the nodes. FIG. 6 depicts an example weighted complete graph 600 that is constructed in accordance with one or more embodiments of the present invention, and depicts a histogram 602 that is created for graph 600 in accordance with one or more embodiments of the present invention. In graph 600, each node represents a string such as an input string or a stored string, in which the string is made up of a set of characters. Histogram 602 provides a similarity matrix that is constructed by measuring the chi-square similarity between characters of the nodes.

Figure 7:
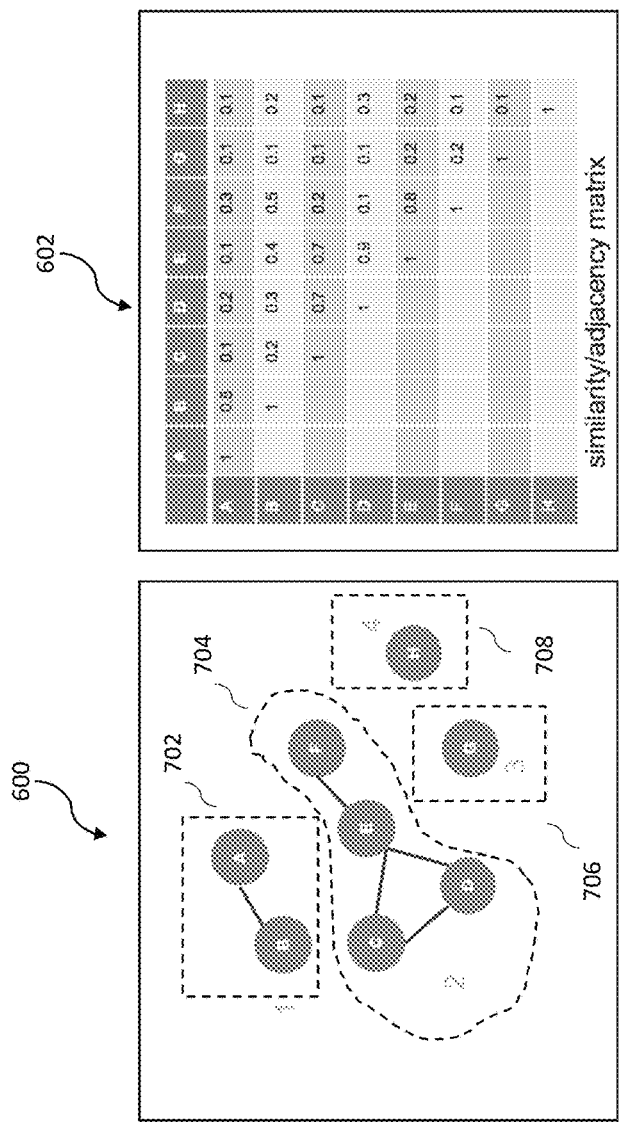
FIG. 7 depicts an example plurality of connected components that may result from cutting of edges of the example weighted complete graph of FIG. 6 based on weights of the example histogram in accordance with one or more embodiments of the present invention.

In some embodiments of the present invention, the separation and labeling is performed by cutting edges of the graph whose weight is lower than a predetermined similarity threshold, and then labeling each of the nodes. By cutting edges of the graph that have a weight that is lower than a predetermined similarity threshold, a number of connected components are created in which a connected component includes the nodes that remain linked in a particular group. Nodes that are grouped in the same connected component are labeled as a group. FIG. 7 depicts an example of a plurality of connected components 702, 704, 706, and 708 that result from cutting edges of weighted complete graph 600 based on weights of histogram 602 that are lower than a predetermined similarity threshold in accordance with one or more embodiments of the present invention. In the example shown in FIG. 7, node C represents the symbolic word "Trojan-Downloader.Delf.avj", node D represents the symbolic word "Trojan-Downloader.Delf.awg", node E represents the symbolic word "Trojan-Clicker.Win32.Small.kj", node F represents the symbolic word "Ransom.Win32.Shade", and node H represents the symbolic word "Ransom:ZCryptor.A." In the example shown in FIG. 7, the plurality of connected components 702, 704, 706, and 708 result from the cutting of edges that have a chi-square character similarity that is lower than 0.7. Accordingly, connected component 702 is created that includes nodes A and B, connected component 704 is created that includes nodes C, D, E, and F, connected component 706 is created in which the component only includes node G, and connected component 8 is created that only includes node H.

Figure 8:
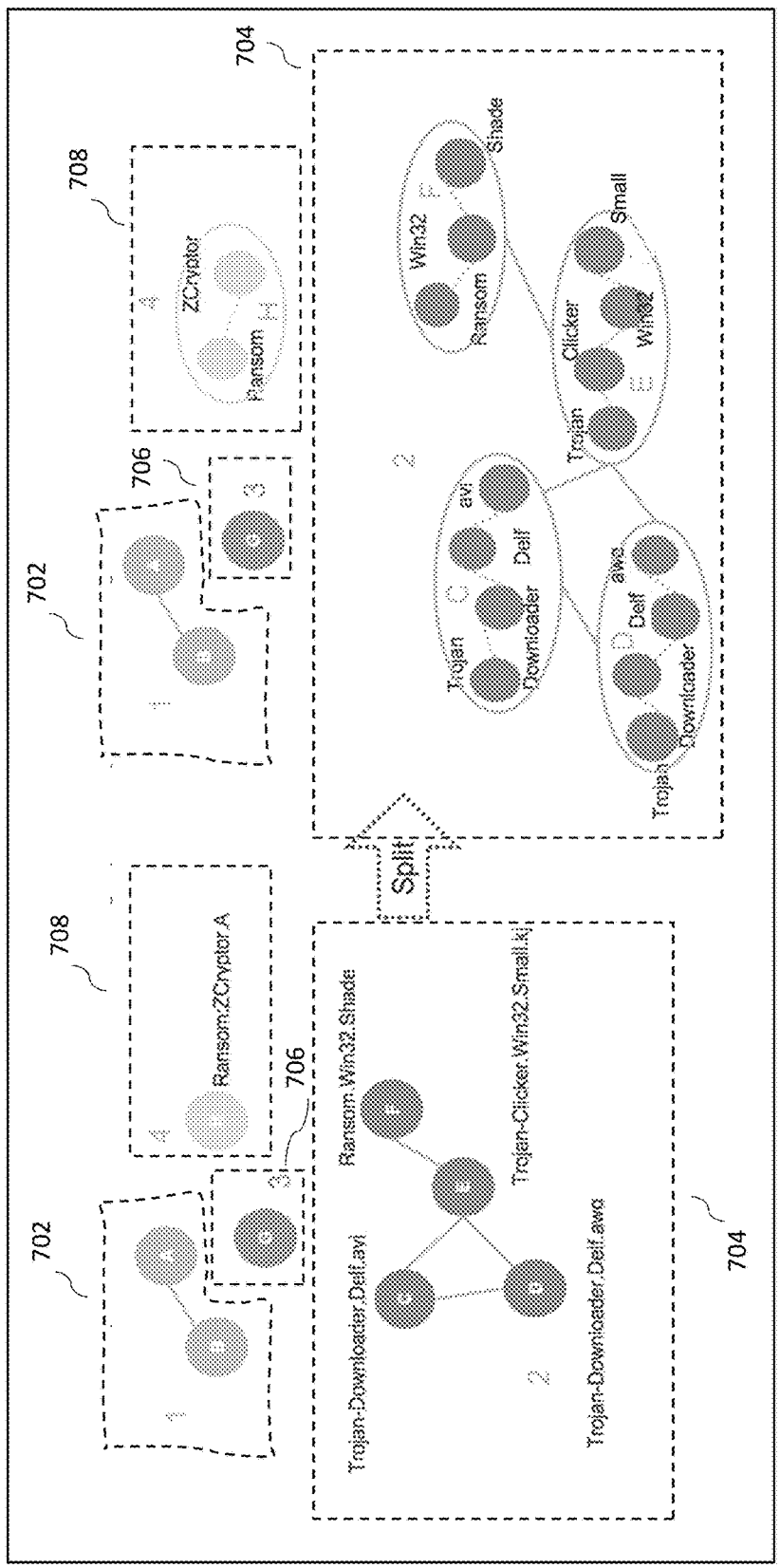
FIG. 8 depicts an example splitting procedure in accordance with one or more embodiments of the present invention, in which nodes of FIG. 7 that are found in connected components having valid tokens are split into sub-nodes.
Figure 9:
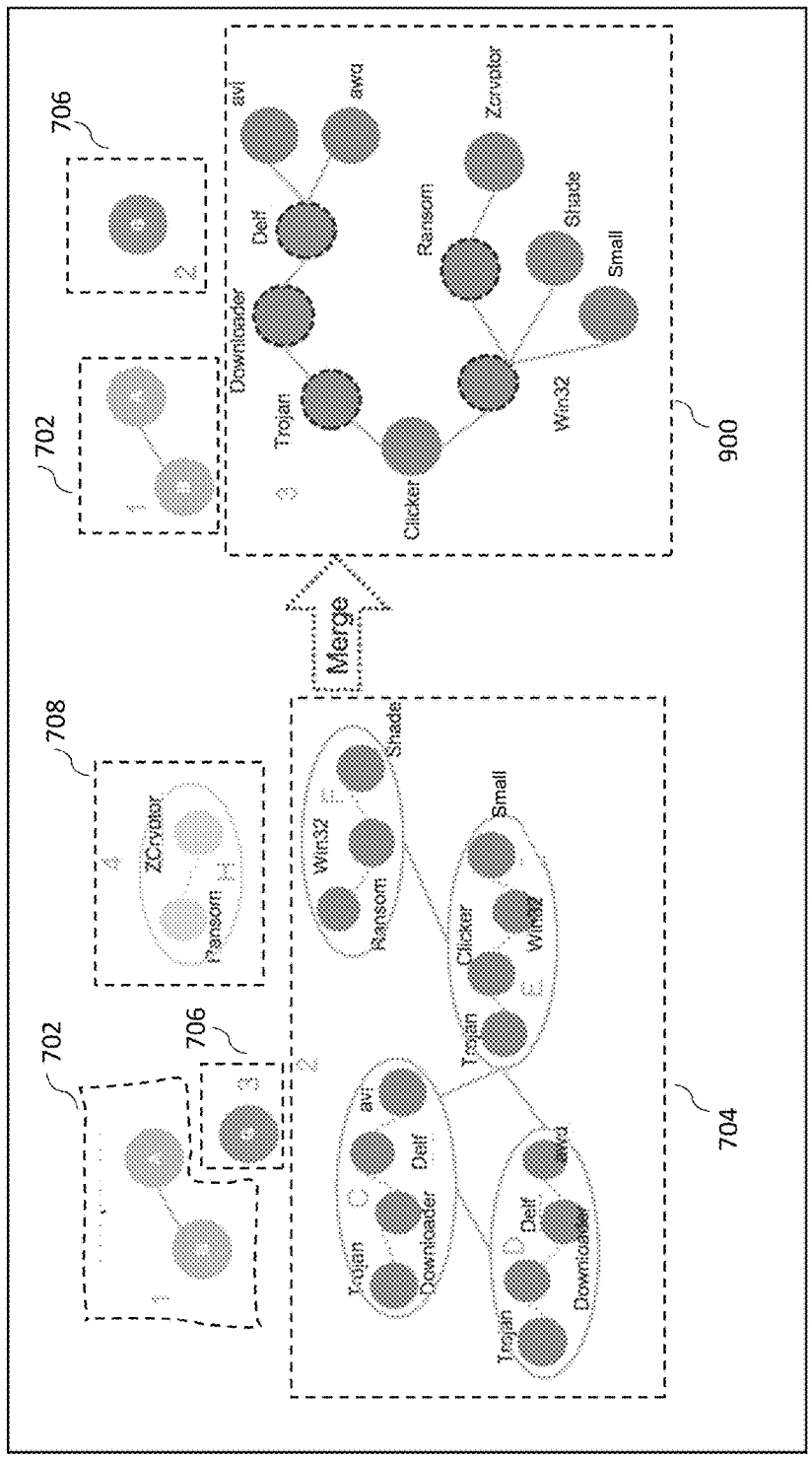
FIG. 9 depicts an example merging procedure in accordance with one or more embodiments of the present invention, in which sub-nodes of FIG. 8 are merged to form a branching graph.

In some embodiments of the present invention, the graph partitioning via node splitting and merging is performed by identifying which nodes (if any) have valid significant tokens, then splitting each node that has valid significant tokens into a new connected graph, in which each node of the new graph represents a token of the string, and then merging the split nodes by merging the bridge nodes. In some embodiments of the present invention, nodes that have valid significant tokens refer to nodes that have tokens that are not generic terms such as malware, virus, etc. In some embodiments of the present invention, nodes that have a pure digit string (i.e., only digit tokens) would not be valid. In some embodiments of the present invention, nodes that have valid significant tokens further or alternatively refer to nodes in which the length of the tokens meet or extend a minimum character length threshold. Each node that is merged into a same connected component is relabeled. FIG. 8 depicts an example of a splitting procedure in accordance with one or more embodiments of the present invention, in which nodes found in connected component 704 and connected component 708 are split into tokens (i.e., sub-nodes) corresponding to a subset of characters in accordance with one or more embodiments of the present invention. In the example shown in FIG. 8, node H is split up into two sub-nodes, a first being the non-symbolic word "Ransom" and a second being the non-symbolic word "ZCryptor". Similarly, node C is split up into four corresponding sub-nodes, a first being the non-symbolic word "Trojan", the second being the non-symbolic word "Downloader", a third being the non-symbolic word "Delf", and a fourth being the non-symbolic word "avj". Nodes E and F have valid tokens and thus are similarity split up into corresponding sub-nodes. FIG. 9 depicts an example merging procedure, in which the sub-nodes of FIG. 8 are merged to form a branching graph 900 in accordance with one or more embodiments of the present invention. In some embodiments of the present invention, branching graph 900 is formed by identifying and merging sub-nodes that are bridge nodes, in which a bridge node is a sub-node that appears more than once in sub-nodes of the nodes of the connected components 702, 704, 706, 708. In the example shown in FIG. 9, for example, the sub-nodes "Trojan," "Downloader", "Delf", Win32", and "Ransom" each appear more than once and thus are bridge nodes. The merging of the sub-nodes results in the forming of branching graph 900, which is a connected component made up of linked sub-nodes.

Referring back to FIG. 5, in some embodiments of the present invention, bucket generator component 406 includes a GTB generator 512 and an MCB generator 514. In general, GTB generator 512 is configured to identify generic words that are similar to a malware string, and MCB generator 514 is configured to find combinations of generic words. In particular, in some embodiments of the present invention, GTB generator 512 is configured to train a word2vec model using non-symbolic words, select top n words that are semantically similar to the word 'malware," and then construct a GTB using the selected top n words. In some embodiments of the present invention, the GTB that is generated by GTB generator 512 is stored in a database such as GTB database 412. In some embodiments of the present invention, MCB generator 514 is configured to calculate pointwise mutual information (PMI) for each n-gram of the generated word2vec model and to keep high average PMI n-grams in bootstrap resampling samples while removing low PMI n-grams. MCB generator 514 is configured to construct an MCB using the n-grams that were retained. In some embodiments of the present invention, the MCB that is generated by MCB generator 514 is stored in a database such as MCB database 414.

In some embodiments of the present invention, malname exploit clustering component 408 includes a GTB detector 516, a duplication filter 518, a superscript filter 520, and a MCB detector 522. Malname exploit clustering component 408 is configured to utilize a hierarchy of filters and detectors to identify whether the input string includes non-symbolic words which are to be filtered out. For example, in some embodiments of the present invention, GTB detector 516 is configured to detect and filter out non-symbolic phrases that include a generic word. In some embodiments of the present invention, duplication filter detector 518 is configured to filter out non-symbolic phrases that include duplicate words. In some embodiments of the present invention, superscript filter 520 is configured to filter out non-symbolic phrases that include non-symbolic words that are associated with known scripts. In some embodiments of the present invention, MCB detector 522 is configured to filter out non-symbolic phrases that are found in an MCB. In some embodiments of the present invention, if an input string passes the GTB detector, duplication filter, superscript filter, and MCB detector, the input string is then labeled as being a valid malware common name if malname exploit clustering component 408 determines that the non-symbolic phrase includes a version number that is not unknown.

In some embodiments of the present invention, composition term processing component 416 includes a GTB eraser 524, DTB retriever 526, a GTB and MCB retriever 528, and a naming convention detector 530. Composition term processing component 416 is configured to process input strings that include symbolic phrases and non-symbolic words. In some embodiment of the present invention, generic term eraser 524 is configured to remove a non-symbolic word from an input string in response to naming convention detector detecting 530 determining that the non-symbolic word of the input string is a generic/function name word. In some embodiments of the present invention, the non-symbolic word is removed from the input string.

Figure 10:
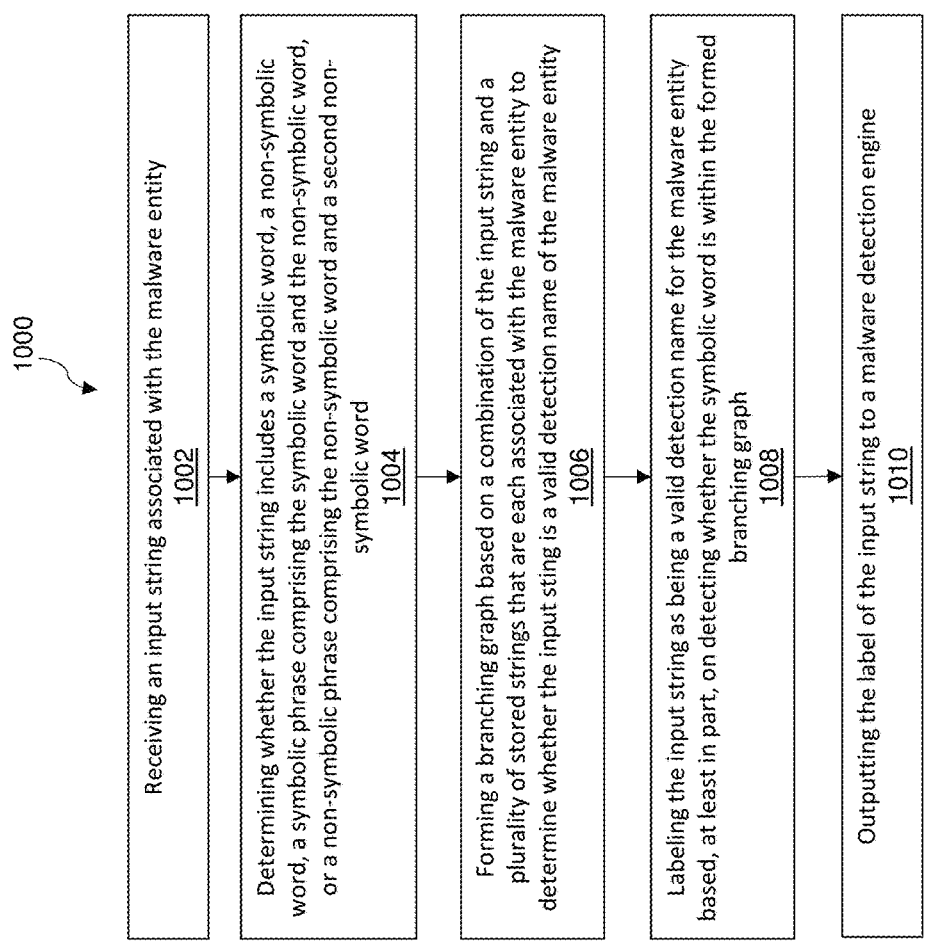
FIG. 10 depicts a flow diagram illustrating an example methodology in accordance with one or more embodiments of the present invention.

Additional details of the operation of system 400 will now be described with reference to FIG. 10, in which FIG. 10 depicts a flow diagram illustrating a methodology 1000 according to one or more embodiments of the present invention. At 1002, an input string associated with the malware entity is received. In some embodiments of the present invention, the input string is received from NLP engine. At 1004, a determination is made as to whether the input string includes a symbolic word, a non-symbolic word, a symbolic phrase comprising the symbolic word and the non-symbolic word, or a non-symbolic phrase comprising the non-symbolic word and a second non-symbolic word. In some embodiments of the present invention, the symbolic word includes two or more nouns each separated by a symbol. At 1006, upon determining that the input malware string includes the symbolic word, a branching graph is formed to determine whether the input string is a valid detection name of the malware entity. In some embodiments of the present invention, the branching graph is formed based on a combination of the input string and a plurality of stored strings that are each associated with the malware entity, in which the branching graph is formed by at least performing a first graph partitioning stage and a second graph partitioning stage. In some embodiments of the present invention, the first graph partitioning stage is performed via character chi-square histogram similarity, and the second graph partitioning stage is performed via node splitting and merging of split nodes. At 1008, the input string is labeled as being a valid detection name for the malware entity based, at least in part, on whether the symbolic word is detected as being within the formed branching graph. At 1010, the label of the input string is outputted to a malware detection engine. In some embodiments of the present invention, the label is outputted to the malware detection engine in response to labeling the input string as being a valid detection/common name of the malware entity. In some embodiments of the present invention, the malware detection engine is configured to detect the malware entity based on the outputted label.

In some embodiments of the present invention, the first graph partitioning stage includes constructing, by the system, a weighted fully connected graph based on the input string and the plurality of stored strings associated with the malware entity, in which the constructed graph includes a plurality of nodes and a plurality of edges connecting the plurality of nodes. The first graph partitioning stage further includes separating the constructed graph into a first plurality of connected components by cutting edges that have a weight that is lower than a given similarity threshold. The first graph partitioning stage further includes labeling each node, of the plurality of nodes, based on the first plurality of connected components. In some embodiments of the present invention, the plurality of nodes includes a first node and a plurality of second nodes, in which the first node is the input string, wherein each respective node of the plurality of second nodes is a respective stored string of the plurality of stored strings. Each edge, of the plurality of edges, is assigned a weight by transforming each node connected by the edge into a character histogram and calculating the chi-square similarity between the transformed nodes. In some embodiments of the present invention, nodes that are in the same connected component are labeled as a group.

In some embodiments of the present invention, the second graph partitioning stage includes splitting each node having valid significant tokens into a plurality of sub-nodes. In some embodiments of the present invention, each sub-node includes a subset of characters of the node. The second graphing partitioning stage further includes merging the plurality of sub-nodes to form a plurality of second connected components by merging bridge nodes of the plurality of sub-nodes. In some embodiments of the present invention, the bridge nodes are sub-nodes that were found in more than one connected component of the first plurality of connected components. The second graphing partitioning stage further includes relabeling each merged node, of the plurality of nodes, based on whether the merged node is found within the same second connect component of the second plurality of connected components.

In some embodiments of the present invention, methodology 1000 further includes executing a generic term bucket generator and executing a malware collocation bucket generator. In some embodiments of the present invention, methodology 1000 further includes executing a naming convention detector upon determining that the input string includes the non-symbolic word or the non-symbolic phrase. The naming convention detector is configured to detect, based on an output of at least one of the generic term bucket generator and the malware collocation bucket generator, whether the non-symbolic word is a generic word. In some embodiments of the present invention, methodology 1000 includes, upon determining that the input string includes the non-symbolic word, labeling the input as being a valid detection name if the naming convention detector detects that the non-symbolic word is a non-generic word. In some embodiments of the present invention, methodology 1000 includes, upon determining that the input string includes the non-symbolic word, labeling, by the system, the input string as being an invalid common name in response to the naming convention detector detecting that the non-symbolic word is a function name word.

In some embodiments of the present invention, the generic term bucket generator is configured to train a word2vec model based on a plurality of non-symbolic words, select top n number of words that are semantically similar to the word malware; and construct a generic term bucket based on the selected top n number of words.

In some embodiments of the present invention, the malware collocation bucket generator is configured to calculate pointwise mutual information (PMI) for each n-gram of the trained word2vec model and to filter n-grams of the word2vec model by retaining n-grams having high average PMI n-grams in bootstrap resampling samples, in which low average PMI n-grams are removed. The malware collocation bucket generator is configured to construct a malware collocation bucket based on the retained n-grams. In some embodiments of the present invention, high average PMI n-grams are n-grams of the trained word2vec model that have an average PMI that is higher than a threshold PMI value. In some embodiments of the present invention, low average PMI n-grams are n-grams of the trained word2vec model that have an average PMI that is lower than the threshold PMI value.

In some embodiments of the present invention, methodology 1000 further includes executing a generic term eraser upon determining that the input string includes a symbolic phrase that is made up of at least a symbolic word and a non-symbolic word. The generic term eraser is configured to remove the non-symbolic word from the input string in response to the naming convention detector detecting that the non-symbolic word is a generic word, in which the non-symbolic word is removed from the input string prior to the forming of the branching graph.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying a valid malware detection name for a malware entity comprising:
   receiving, by a system comprising one or more processors, an input string associated with the malware entity;
   determining, by the system, whether the input string includes a symbolic word, a non-symbolic word, a symbolic phrase comprising the symbolic word and the non-symbolic word, or a non-symbolic phrase comprising the non-symbolic word and a second non-symbolic word;

upon determining that the input string includes the symbolic word or the symbolic phrase, forming, by the system, a branching graph based on a combination of the input string and a plurality of stored strings that are each associated with the malware entity to determine whether the input string is the valid malware detection name of the malware entity, wherein the branching graph is formed by at least performing a first graph partitioning stage and a second graph partitioning stage, wherein the first graph partitioning stage is performed via character chi-square histogram similarity, wherein the second graph partitioning stage is performed via node splitting and merging of split nodes;

labeling, by the system, the input string as being the valid malware detection name for the malware entity based, at least in part, on detecting whether the symbolic word is within the formed branching graph; and outputting, by the system, the label of the input string to a malware detection engine.

2. The computer-implemented method of claim 1, wherein the first graph partitioning stage includes:

constructing, by the system, a weighted fully connected graph based on the input string and the plurality of stored strings associated with the malware entity, wherein the constructed graph includes a plurality of nodes and a plurality of edges connecting the plurality of nodes, wherein the plurality of nodes comprises a first node and a plurality of second nodes, wherein the first node comprises the input string, wherein each respective node of the plurality of second nodes comprises a respective stored string of the plurality of stored strings, wherein each edge of the plurality of edges is assigned a weight by transforming each node connected by the edge into a character histogram and calculating the chi-square similarity between the transformed nodes;

separating the constructed graph into a first plurality of connected components by cutting edges that have a weight that is lower than a given similarity threshold; and labeling each node of the plurality of nodes based on the first plurality of connected components.

3. The computer-implemented method of claim 2, wherein the second graph partitioning stage includes:

splitting each node having valid significant tokens into a plurality of sub-nodes;

merging the plurality of sub-nodes to form a plurality of second connected components by merging bridge nodes of the plurality of sub-nodes; and relabeling each merged node of the plurality of nodes based on whether the merged node is in a same second connect component of the second plurality of connected components, wherein the branching graph comprises a connected component of the second plurality of connected components.

4. The computer-implemented method of claim 1 further comprising:

upon determining that the input string includes the non-symbolic word, executing, by the system, executing a generic term bucket generator and a malware collocation bucket generator that are configured to detect, based on an output of at least one of the generic term bucket generator and the malware collocation bucket generator, whether the non-symbolic word is a generic word; and upon determining that the input string includes the non-symbolic word, labeling, by the system, the input string as being an invalid common name in response to the naming convention detector detecting that the non-symbolic word is a function name word.

5. The computer-implemented method of claim 4, wherein the generic term bucket generator is configured to:

train a word2vec model based on a plurality of non-symbolic words;

select top n number of words that are semantically similar to the word malware; and construct a generic term bucket based on the selected top n number of words.

6. The computer-implemented method of claim 5, wherein the malware collocation bucket generator is configured to:

calculate pointwise mutual information (PMI) for each n-gram of the trained word2vec model;

filter n-grams of the word2vec model by retaining n-grams having high average PMI n-grams in bootstrap resampling samples and removing low average PMI n-grams in the bootstrap resampling samples, wherein the high average PMI n-grams comprises n-grams of the trained word2vec model having an average PMI that is higher than a threshold PMI value, wherein the low average PMI n-grams comprises n-grams of the trained word2vec model having an average PMI that is lower than the threshold PMI value; and construct a malware collocation bucket based on the retained n-grams.

7. The computer-implemented method of claim 4 further comprising:

executing, by the system, a generic term eraser upon determining that the input string includes the symbolic phrase comprising the symbolic word and the non-symbolic word, wherein the generic term eraser is configured to remove the generic word from the input string.

8. A computer program product for identifying a valid malware detection names, the computer program product comprising a computer readable storage medium having program instructions embodied therewith, the program instructions executable by a system comprising one or more processors to cause the system to perform a method, the method comprising:

receiving, by the system, an input string associated with a malware entity;

determining, by the system, whether the input string includes a symbolic word, a non-symbolic word, a symbolic phrase comprising the symbolic word and the non-symbolic word, or a non-symbolic phrase comprising the non-symbolic word and a second non-symbolic word;

upon determining that the input string includes the symbolic word, forming, by the system, a branching graph based on a combination of the input string and a plurality of stored strings that are each associated with the malware entity to determine whether the input string is the valid malware detection name of the malware entity, wherein the branching graph is formed by at least performing a first graph partitioning stage and a second graph partitioning stage, wherein the first graph partitioning stage is performed via character chi-square histogram similarity, wherein the second graph partitioning stage is performed via node splitting and merging of split nodes;

labeling, by the system, the input string as being the valid malware detection name for the malware entity based, at least in part, on detecting whether the symbolic word is within the formed branching graph; and outputting, by the system, the label of the input string to a malware detection engine.

9. The computer program product of claim 8, wherein the first graph partitioning stage includes:

constructing, by the system, a weighted fully connected graph based on the input string and the plurality of stored strings associated with the malware entity, wherein the constructed graph includes a plurality of nodes and a plurality of edges connecting the plurality of nodes, wherein the plurality of nodes comprises a first node and a plurality of second nodes, wherein the first node comprises the input string, wherein each respective node of the plurality of second nodes comprises a respective stored string of the plurality of stored strings, wherein each edge of the plurality of edges is assigned a weight by transforming each node connected by the edge into a character histogram and calculating the chi-square similarity between the transformed nodes;

separating the constructed graph into a first plurality of connected components by cutting edges that have a weight that is lower than a given similarity threshold; and labeling each node of the plurality of nodes based on the first plurality of connected components.

10. The computer program product of claim 9, wherein the second graph partitioning stage includes:

splitting each node having valid significant tokens into a plurality of sub-nodes;

merging the plurality of sub-nodes to form a plurality of second connected components by merging bridge nodes of the plurality of sub-nodes; and relabeling each merged node of the plurality of nodes based on whether the merged node is in a same second connect component of the second plurality of connected components, wherein the branching graph comprises a connected component of the second plurality of connected components.

11. The computer program product of claim 8, wherein the method further includes:

upon determining that the input string includes the non-symbolic word, executing, by the system, executing a generic term bucket generator and a malware collocation bucket generator that are configured to detect, based on an output of at least one of the generic term bucket generator and the malware collocation bucket generator, whether the non-symbolic word is a generic word; and upon determining that the input string includes the non-symbolic word, labeling, by the system, the input string as being an invalid common name in response to the naming convention detector detecting that the non-symbolic word is a function name word.

12. The computer program product of claim 11, wherein the generic term bucket generator is configured to:

train a word2vec model based on a plurality of non-symbolic words;

select top n number of words that are semantically similar to the word malware; and construct a generic term bucket based on the selected top n number of words.

13. The computer program product of claim 12, wherein the malware collocation bucket generator is configured to:

calculate pointwise mutual information (PMI) for each n-gram of the trained word2vec model;

filter n-grams of the word2vec model by retaining n-grams having high average PMI n-grams in bootstrap resampling samples and removing low average PMI n-grams in the bootstrap resampling samples, wherein the high average PMI n-grams comprises n-grams of the trained word2vec model having an average PMI that is higher than a threshold PMI value, wherein the low average PMI n-grams comprises n-grams of the trained word2vec model having an average PMI that is lower than the threshold PMI value; and construct a malware collocation bucket based on the retained n-grams.

14. The computer program product of claim 11, wherein the method further includes:

executing, by the system, a generic term eraser upon determining that the input string includes the symbolic phrase comprising the symbolic word and the non-symbolic word, wherein the generic term eraser is configured to remove the generic word from the input string.

15. A system for identifying a valid malware detection name, the system comprising one or more processors configured to perform a method, the method comprising:

receiving, by the system, an input string associated with a malware entity;

determining, by the system, whether the input string includes a symbolic word, a non-symbolic word, a symbolic phrase comprising the symbolic word and the non-symbolic word, or a non-symbolic phrase comprising the non-symbolic word and a second non-symbolic word;

upon determining that the input string includes the symbolic word, forming, by the system, a branching graph based on a combination of the input string and a plurality of stored strings that are each associated with the malware entity to determine whether the input string is the valid malware detection name of the malware entity, wherein the branching graph is formed by at least performing a first graph partitioning stage and a second graph partitioning stage, wherein the first graph partitioning stage is performed via character chi-square histogram similarity, wherein the second graph partitioning stage is performed via node splitting and merging of split nodes;

labeling, by the system, the input string as being the valid malware detection name for the malware entity based, at least in part, on detecting whether the symbolic word is within the formed branching graph; and outputting, by the system, the label of the input string to a malware detection engine.

16. The system of claim 15, wherein the first graph partitioning stage includes:

constructing, by the system, a weighted fully connected graph based on the input string and the plurality of stored strings associated with the malware entity, wherein the constructed graph includes a plurality of nodes and a plurality of edges connecting the plurality of nodes, wherein the plurality of nodes comprises a first node and a plurality of second nodes, wherein the first node comprises the input string, wherein each respective node of the plurality of second nodes comprises a respective stored string of the plurality of stored strings, wherein each edge of the plurality of edges is assigned a weight by transforming each node connected by the edge into a character histogram and calculating the chi-square similarity between the transformed nodes;

separating the constructed graph into a first plurality of connected components by cutting edges that have a weight that is lower than a given similarity threshold; and labeling each node of the plurality of nodes based on the first plurality of connected components.

17. The system of claim 16, wherein the second graph partitioning stage includes:

splitting each node having valid significant tokens into a plurality of sub-nodes;

merging the plurality of sub-nodes to form a plurality of second connected components by merging bridge nodes of the plurality of sub-nodes; and relabeling each merged node of the plurality of nodes based on whether the merged node is in a same second connect component of the second plurality of connected components, wherein the branching graph comprises a connected component of the second plurality of connected components.

18. The system of claim 15, wherein the method further includes:

upon determining that the input string includes the non-symbolic word, executing, by the system, executing a generic term bucket generator and a malware collocation bucket generator that are configured to detect, based on an output of at least one of the generic term bucket generator and the malware collocation bucket generator, whether the non-symbolic word is a generic word; and upon determining that the input string includes the non-symbolic word, labeling, by the system, the input string as being an invalid common name in response to the naming convention detector detecting that the non-symbolic word is a function name word.

19. The system of claim 18, wherein the generic term bucket generator is configured to:

train a word2vec model based on a plurality of non-symbolic words;

select top n number of words that are semantically similar to the word malware; and construct a generic term bucket based on the selected top n number of words.

20. The system of claim 19, wherein the malware collocation bucket generator is configured to:

calculate pointwise mutual information (PMI) for each n-gram of the trained word2vec model;

filter n-grams of the word2vec model by retaining n-grams having high average PMI n-grams in bootstrap resampling samples and removing low average PMI n-grams in the bootstrap resampling samples, wherein the high average PMI n-grams comprises n-grams of the trained word2vec model having an average PMI that is higher than a threshold PMI value, wherein the low average PMI n-grams comprises n-grams of the trained word2vec model having an average PMI that is lower than the threshold PMI value; and construct a malware collocation bucket based on the retained n-grams.

* * * * *